United States Patent
Jiang et al.

(10) Patent No.: US 11,650,408 B2
(45) Date of Patent: May 16, 2023

(54) TRUE-SEEING INFRARED INDUSTRIAL ENDOSCOPE AND IMAGE CAPTURING METHOD FOR SAME

(71) Applicant: CENTRAL SOUTH UNIVERSITY, Hunan (CN)

(72) Inventors: Zhaohui Jiang, Changsha (CN); Jilin Zhu, Changsha (CN); Zhipeng Chen, Changsha (CN); Weihua Gui, Changsha (CN); Yongfang Xie, Changsha (CN); Chunhua Yang, Changsha (CN); Haifeng Zhang, Changsha (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 90 days.

(21) Appl. No.: 16/971,294

(22) PCT Filed: Nov. 16, 2018

(86) PCT No.: PCT/CN2018/115785
§ 371 (c)(1),
(2) Date: Aug. 19, 2020

(87) PCT Pub. No.: WO2020/019585
PCT Pub. Date: Jan. 30, 2020

(65) Prior Publication Data
US 2021/0011275 A1    Jan. 14, 2021

(30) Foreign Application Priority Data
Jul. 24, 2018   (CN) .......................... 201810819365.5

(51) Int. Cl.
*G02B 23/24*   (2006.01)
*H04N 5/33*    (2023.01)
*H04N 23/50*   (2023.01)

(52) U.S. Cl.
CPC ..... *G02B 23/2492* (2013.01); *G02B 23/2484* (2013.01); *H04N 5/33* (2013.01); *H04N 23/555* (2023.01)

(58) Field of Classification Search
CPC ............ G02B 23/2492; G02B 23/2484; G02B 23/2446; G02B 23/26; G02B 23/2407;
(Continued)

(56) References Cited

U.S. PATENT DOCUMENTS

2002/0076178 A1* 6/2002 Klocek ............. A61B 5/02007
385/106

FOREIGN PATENT DOCUMENTS

CN       201600497 U      10/2010
CN       102944928 A       2/2013
(Continued)

OTHER PUBLICATIONS

Chen et al. (English Translation of CN 103605204) (Year: 2014).*
(Continued)

*Primary Examiner* — Amir Shahnami
(74) *Attorney, Agent, or Firm* — Syncoda LLC; Feng Ma

(57) ABSTRACT

A true-seeing infrared industrial endoscope endoscope includes an external shell protective unit including a housing and an electrical appliance component box connected to a rear end of the housing. A cavity of the housing is provided with a dual capturing-imaging unit including at least two capturing-imaging subunits. Each of the capturing-imaging subunits includes a light splitter, an image capturing lens, an infrared imaging tube, and a visible light imaging tube. The electrical appliance component box is provided with a communication module and a power supply electrically connected to the dual capturing-imaging unit and the communication module. The communication module is communicatively connected to the dual capturing-imaging unit and
(Continued)

an upper computer via a communication bus, and the power supply is electrically connected to the dual capturing-imaging unit via a power bus.

6 Claims, 8 Drawing Sheets

(58) Field of Classification Search
CPC .......... G02B 23/2476; H04N 5/33; H04N 2005/2255; H04N 5/332; H04N 5/2254; H04N 5/2258
USPC .......................................................... 348/83
See application file for complete search history.

(56) References Cited

FOREIGN PATENT DOCUMENTS

| | | |
|---|---|---|
| CN | 103605204 A | 2/2014 |
| CN | 103667563 A | 3/2014 |
| CN | 104257341 A | 1/2015 |
| CN | 104897284 A | 9/2015 |
| CN | 205071156 U | 3/2016 |
| CN | 106989824 A | 7/2017 |
| CN | 206482547 U | 9/2017 |
| CN | 206725843 U | 12/2017 |
| CN | 107561679 A | 1/2018 |
| JP | H07323004 A | 12/1995 |
| JP | H09265047 A | 10/1997 |
| KR | 20140065069 A | 5/2014 |

OTHER PUBLICATIONS

Kim et al. (English Translation of KR20180016687A) (Year: 2016).*
Funabashi et al. (English Translation of JP 07323004) (Year: 1994).*
Gao et al. (English Translation of WO 2004/002136) (Year: 2003).*
International Search Report in the international application No. PCT/CN2018/115785, dated Mar. 27, 2019.

* cited by examiner

TRUE-SEEING INFRARED INDUSTRIAL ENDOSCOPE AND IMAGE CAPTURING METHOD FOR SAME

CROSS-REFERENCE TO RELATED APPLICATIONS

The present application is a national stage of International Application No. PCT/CN2018/115785 filed on Nov. 16, 2018, which claims priority to Chinese Patent Application No. 201810819365.5, filed on Jul. 24, 2018. The disclosures of these applications are hereby incorporated by reference in their entireties.

TECHNICAL FIELD

The disclosure relates to the technical field of photoelectronic and infrared imaging, and in particular to a true-seeing infrared industrial endoscope and an image capturing method for the same.

BACKGROUND

An apparatus for heating or melting metal is referred to as an industrial stove, and an apparatus for heating or melting non-metal is referred to as a kiln. Both the industrial stove and the kiln are generally referred to as industrial furnaces that mainly refer to apparatuses for heat utilization by a combustion reaction. The industrial furnace is a huge sealed reaction container, and thus the complex reaction process and working condition inside the industrial furnace cannot be achieved by direct observation or effective measurement. Due to its full sealing, effective information is missing, and thus it is impossible to provide an effective guidance for the production control. For a long time, the control of the industrial furnace is completely dependent on experience of furnace superintendents and section chiefs. In addition, the detection on most of key parameters during operation is also dependent on manual empirical estimation. The lack of online detection device for key parameters is one of root causes for overdependence on labor. However, the harsh environment with the high temperature, high pressure, high dust and lightless inside the industrial furnace is an important reason that makes the detection device difficult to detect key parameters and difficult to carry out three-dimensional reconstruction. Hence, it is significant to design an online monitoring device capable of overcoming the harsh environment with the high temperature, high pressure, high dust and lightless inside the industrial furnace, obtaining clear images, temperature information of the industrial furnace interior, and obtaining and utilizing depth-of-field information to achieve the three-dimensional reconstruction.

An invention patent with publication number CN 104257341A discloses an endoscope optical system used for infrared and visible light monitoring simultaneously. The working principle of this system is that through a color separation plate, a medium-wave infrared light is transmitted to form a subsequent infrared light sub-beam, while visible light is reflected to form a visible light sub-beam. The infrared light sub-beam is then guided by a group consisting of field lens and secondary imaging lens, and is received by the image plane through an infrared camera. The visible light sub-beam is guided by a group of imaging lenses, and imaged by a customized visible light Charge Coupled Device (CCD). However, such a design is a universal design of an optical path in essence, without protective measures designed for the special environment of blast furnaces, so it cannot be used in the blast furnaces having harsh internal environment.

An invention patent with publication number CN 103605204A discloses a parallel low-light-loss backlight high-temperature industrial endoscope. In order to make the device resistant to the high temperature, an imaging system thereof is composed of an optical eyepiece at the front end under the high temperature, image guide fiber bundles and light guide structure at the central, and an imaging chip at the rear end under the low temperature. This device also uses active backlight, so as to adapt to the high-dust environment of the industrial furnace. However, as only visible light is used, it is impossible to completely avoid the influence of high dust in the industrial furnace. In particularly high dust conditions, it would be failed to capture images by this device. As only a double-helical water-cooling structure is used, the device has poor water-cooling effect, poor heat dissipation effect, thereby shorting a service life of the device greatly. Furthermore, the image captured by the device is merely a two-dimensional image, and cannot be used for the three-dimensional reconstruction.

A utility model patent with publication number CN 201600497U provides a dual-camera industrial endoscope. This endoscope includes two holes respectively formed on an upper shell and a lower shell, and a camera is placed on each hole. The device may simultaneously capture images along two directions, but only can observe scenes on front and lateral directions independently. In addition, only one camera is provided at the front end, so that it is impossible to expand the front view, and thus it is impossible to carry out a binocular stereoscopic imaging.

SUMMARY

The disclosure provides a true-seeing infrared industrial endoscope, which solves problems of obtaining clear images, temperature information of the industrial furnace interior, as well as obtaining and utilizing depth-of-field information for three-dimensional reconstruction under the harsh environment of the high temperature, high pressure, high dust and lightness.

The technical solutions of the disclosure are shown as follows.

A true-seeing infrared industrial endoscope is provided. The true-seeing infrared industrial endoscope includes an external shell protective unit. The external shell protective unit includes a housing and an electrical appliance component box connected to a rear end of the housing. A cavity of the housing is provided with a dual capturing-imaging unit including at least two capturing-imaging subunits. Each of the capturing-imaging subunits includes a light splitter disposed at a central portion of the cavity of the housing, an image capturing lens disposed at a front portion of the cavity of the housing and connected to a front end of the light splitter via an image guide fiber, an infrared imaging tube disposed at a rear portion of the cavity of the housing and communicating with a light outlet I at a rear end of the light splitter, and a visible light imaging tube disposed at the rear portion of the cavity of the housing and communicating with a light outlet II at the rear end of the light splitter.

The electrical appliance component box is provided with a communication module and a power supply electrically connected to the dual capturing-imaging unit and the communication module. The communication module is communicatively connected to the dual capturing-imaging unit and is connected to an upper computer via a communication bus.

The power supply is electrically connected to the dual capturing-imaging unit via a power bus.

Electronic components required by the endoscope are arranged in the electrical appliance component box of the housing, including the power supply, the communication module and the communication bus. A front end of the device is the image capturing lens, and the image capturing lens is an optical eyepiece whose main function is to collect optical information of a tested object under a high-temperature environment in the furnace.

Further, the infrared imaging tube is of an elongated shape, and includes elongated chalcogenide glass and an infrared imaging chip. A front end of the chalcogenide glass is connected to the light outlet I of the light splitter, a rear end of the chalcogenide glass is communicatively connected to the infrared imaging chip, and an axial external surface of the chalcogenide glass is covered with an internal protective layer I into which the infrared imaging chip is embedded. An axial external surface of the internal protective layer I is sequentially covered with an internal protective film I, a protective tube I, an external protective film I and an external protective layer I; and the chalcogenide glass is a transmission channel for infrared light and is responsible for transmitting the infrared light from the light splitter from a front end of the infrared imaging tube to the infrared imaging chip.

Further, the visible light imaging tube is of an elongated shape, and includes an elongated image guide fiber and a visible light imaging chip. A front end of the image guide fiber is connected to the light outlet II of the light splitter, a rear end of the image guide fiber is communicatively connected to the imaging chip, and an axial external surface of the image guide fiber is covered with an internal protective layer II into which the imaging chip is embedded into the internal protective layer II. An axial external surface of the internal protective layer II is sequentially covered with an internal protective film II, a protective tube II, an external protective film II and an external protective layer II. The visible light imaging tube is capable of resisting a high temperature and transmitting captured optical images to the imaging chip at the rear end of the device, and then the captured optical images are coveted by the imaging chip into digital images for storage and transmission.

Further, the light splitter includes a light splitter body, a light inlet communicating with a front end of the light splitter body, the light outlet II connected to one side of a rear end of the light splitter body, and the light outlet I connected to other side of the rear end of the light splitter body. An end face of the light outlet I is further covered with a light filter. The light inlet is internally connected to the image capturing lens via the image guide fiber, the light outlet II is connected to the visible light imaging tube via the image guide fiber, and the light outlet I is connected to the infrared imaging tube via the chalcogenide glass. The light splitter is two optical apparatuses capable of splitting one light beam into two light sub-beams, and has a main function of splitting light captured by the image capturing lens in the furnace into two light sub-beams. Via the light filter embedded at the light outlet I of the light splitter, light passing through the light outlet I enters the infrared imaging tube, while light passing through the light outlet II enters the visible light imaging tube.

Further, the housing consists of an external protective shell and an internal protective shell. The cavity between the external protective shell and the internal protective shell forms a water-cooling circulation channel. A lower end of the external protective shell is provided with a water inlet communicating with the water-cooling circulation channel, and an upper end of the external protective shell is provided with a water outlet communicating with the water-cooling circulation channel, so that the water inlet, the water-cooling circulation channel, and the water outlet are communicated in sequence and form a water wall cooling system. The upper end of the external protective shell is further provided with an air inlet. The image capturing lens is of a horn shape and is arranged as a horn mouth lens facing towards the front end of the cavity of the housing and communicating with an external environment, so that the air inlet, the cavity of the housing, a cavity of the image capturing lens and the horn mouth of the image capturing lens are communicated in sequence and form a penetrated air-cooling system.

The housing has a structure with two shells, i.e., the external protective shell and the internal protective shell. A complete water-cooling channel is provided between the two shells, so as to provide a circulation channel for water cooling. The water inlet and the water outlet of the water wall cooling system, as well as the air inlet of the air-cooling system are further provided on the external protective shell.

The true-seeing infrared industrial endoscope provided by the disclosure uses two cooling systems (i.e., the complete water wall cooling and a penetrated air-cooling), to guarantee that the device is suitable for the high-temperature environment inside the blast furnace. The water wall cooling system of the true-seeing infrared industrial endoscope is provided with one water inlet at the lower end of the external protective shell and one water outlet at the upper end of the external protective shell, so that water flowing into the water wall circulation cooling system can be recycled. Gas for air cooling is exhausted via a hole (i.e., a horn hole) of the image capturing lens at the front end of the true-seeing infrared industrial endoscope, so as to protect the image capturing lens by an air pressure generated by the air cooling, thereby preventing the lens from being crusted and the front end of the device from being clogged.

According to the true-seeing infrared industrial endoscope provided by the disclosure, light is captured or obtained by the image capturing lens, and then is spited by the light splitter into two light paths. For one light path, only infrared light is transmitted after filtering by the light filter, enters the infrared light imaging tube, and is transmitted to the infrared imaging chip via the infrared light imaging tube and generates infrared digital images. For the other light path, light enters the visible light imaging tube, is transmitted to the visible light imaging chip via the visible light imaging tube, and is converted into visible light digital images. The infrared digital images and the visible light digital images are transmitted to the upper computer via a communication module outside of the furnace. The true-seeing infrared industrial endoscope provided by the disclosure not only can overcome the harsh environment of the high temperature, high pressure, high dust and lightness in the furnace and obtain clear images of the interior of the industrial furnace, but also obtains temperature information of the interior of the industrial furnace, so as to obtain depth-of-field information by the upper computer and utilize the depth-of-field information for three-dimensional reconstruction, achieving an online monitoring function.

The disclosure further provides an image capturing method by using a true-seeing infrared industrial endoscope. By utilizing different penetrability of two different infrared lights to the dust, infrared captures are carried out and temperature information is obtained; and visible light binocular stereoscopic visual capture is carried out via a visible light doublet lens, solving the difficult problem of obtaining three-dimensional information in the blast furnace. The technical solutions of the disclosure are shown as follows.

An image capturing method by using a true-seeing infrared industrial endoscope is provided. The image capturing method includes the following steps.

After a power supply in an electrical appliance component box is powered on, a power-driven circuit and a communication circuit start to work.

Light inside a furnace is captured by the image capturing lens, and the captured light is transmitted to the light splitter via the image guide fiber.

One beam of light is splitted into two sub-beams by the light splitter; for one sub-beam, only infrared light is transmitted after filtering by the light filter and enters the infrared imaging tube, while the other sub-beam enters the visible light imaging tube.

The infrared light entered the infrared imaging tube is transmitted to the infrared imaging chip via the chalcogenide glass to form infrared digital images, and light entered the visible light imaging tube is transmitted to the visible light imaging chip via the image guide fiber to form visible light digital images, thus achieving functions of collecting digital images of an industrial furnace and obtaining temperature information of the industrial furnace interior.

The infrared digital images and the visible light digital images are transmitted to an industrial upper computer via the communication module in the electrical appliance component box, and three-dimensional reconstruction is carried out by using depth-of-field information via the upper computer, so as to achieve an online monitoring function.

Further, flowing water is introduced at a water inlet, passes through a water-cooling circulation channel and a water outlet to form a circulating flow; and air is introduced at an air inlet, passes through a cavity of a housing, a cavity of the image capturing lens and a horn mouth of the image capturing lens to form a circulating flow.

In the image capturing method by the true-seeing infrared industrial endoscope provided by the disclosure, it is guaranteed that the endoscope can work normally under the high-temperature environment of the furnace through air-cooling and water wall cooling of the cooling system. In addition, in the case of light in the furnace, visible light digital images and infrared digital images can be formed simultaneously by the visible light imaging tube and infrared imaging tube via two image capturing lenses in the furnace; in the case of almost no light in the furnace, only the infrared digital images are formed by the infrared imaging tube. The obtained digital images are then transmitted to the subsequent element through the corresponding imaging unit and the digital image information is stored by the communication module outside of the furnace, and transmitted to the upper computer, thus completing a whole working process. The image capturing method not only can obtain the visible light digital image, infrared digital image and temperature information in the furnace, but also achieves three-dimensional reconstruction by using depth-of-field information via the upper computer, performs online monitoring in the furnace, and solves a problem of difficult to obtain three-dimensional information.

The disclosure has the following beneficial effects.

1. Regarding the light guide structure, the disclosure innovatively uses a light splitter to split light from the image capturing lens into two paths, thereby simplifying the structure, eliminating the need for multiple lenses for simultaneous imaging of visible light and infrared light, and reducing the cost.

2. Regarding imaging, the disclosure uses a high-temperature resistant dual capturing-imaging lens to capture optical information at the front end of the device; and transmits the infrared optical information to the infrared imaging chip at the rear end of the device by using the characteristic of chalcogenide glass, thereby achieving the purpose of obtaining temperature information and infrared optical information under the high-temperature environment; and transmits the visible light information to the visible light imaging chip at the rear end of the device for imaging by using with the utilization of the light guide characteristic of the image guide fiber bundle, thereby achieving the purpose of capturing images under the high-temperature environment and performing three-dimensional reconstruction by using the obtained digital images.

3. Regarding the cooling system, the disclosure not only uses the complete water wall water cooling to cool the system, so as to improve the cooling efficiency, but also is equipped with an air cooling system to enhance the cooling effect, improve the work stability, and reduce the use cost.

BRIEF DESCRIPTION OF THE DRAWINGS

The accompanying drawings formed into a part of the disclosure are described here to provide a further understanding of the disclosure; and schematic embodiments and descriptions of the disclosure are intended to explain the disclosure, and do not form an improper limit to the disclosure. In the drawings.

In the figures.

1: power supply, 2: electrical appliance component box, 3: power bus, 4: water outlet, 5: air inlet, 6: external protective shell, 7: internal protective shell, 8: communication module, 9: communication bus, 10: water inlet, 11: visible light imaging tube I, 12: infrared imaging tube I, 13: light splitter I, 14: image capturing lens I, 15: visible light imaging tube II, 16: infrared imaging tube II, 17: light splitter II, 18: image capturing lens II, 19: infrared imaging chip, 20: chalcogenide glass, 21: external protective layer I, 22: external protective film I, 23: protective tube I, 24: internal protective film I, 25: internal protective layer I, 26: visible light imaging chip, 27: image guide fiber, 28: external protective layer II, 29: external protective film II, 30: protective tube II, 31: internal protective film II, 32: internal protective layer II, 33: light filter, 34: light outlet I, 35: light splitter body, 36: light inlet, and 37: light outlet II.

DETAILED DESCRIPTION

The embodiments of the disclosure are described below in detail in combination with reference to the drawings. However, the disclosure may be defined by claims and implemented by multiple different manners covered by the disclosure.

Figure 1:
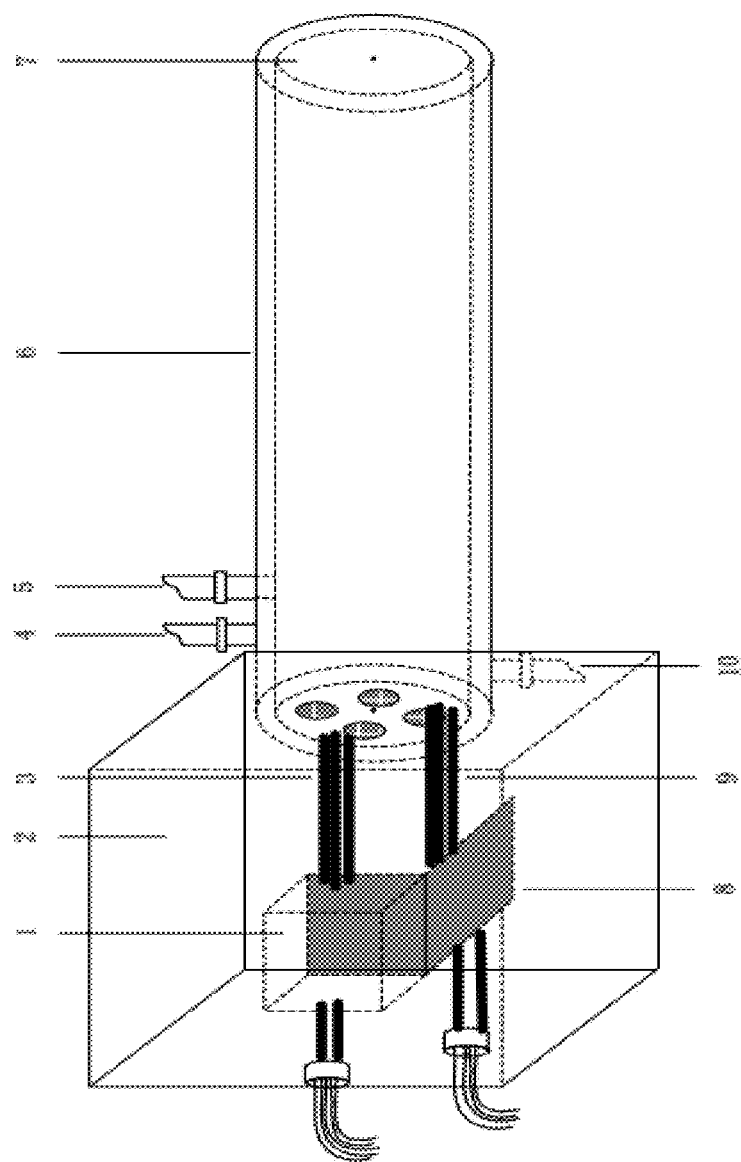
FIG. 1 is a structural schematic diagram of a true-seeing infrared industrial endoscope according to an embodiment of the disclosure.
Figure 2:
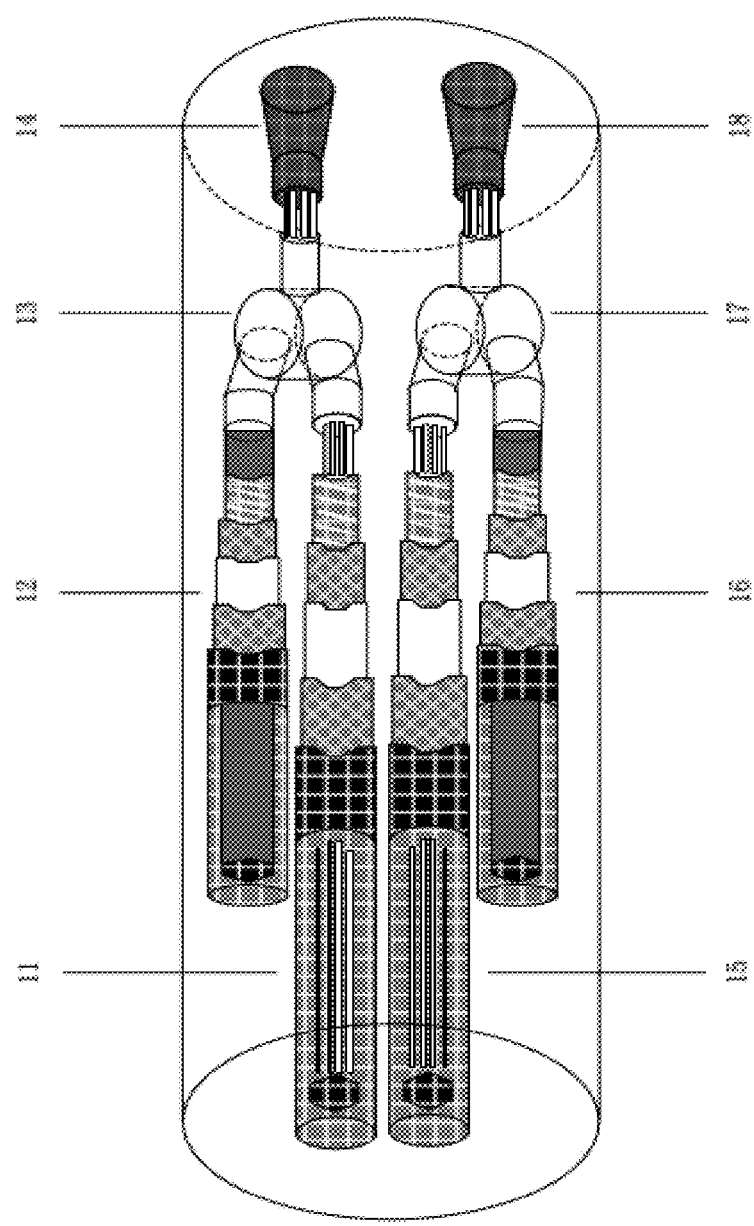
FIG. 2 is a structural schematic diagram of a dual capturing-imaging unit according to an embodiment of the disclosure.
Figure 4:
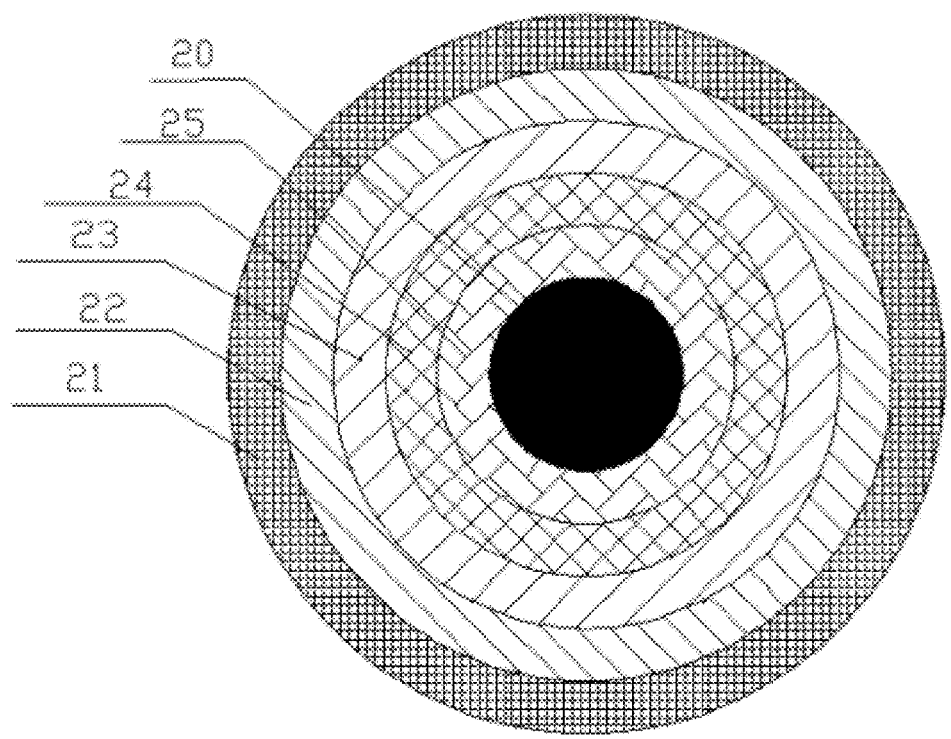
FIG. 4 is an enlarged diagram of a cross section of an infrared imaging tube according to an embodiment of the disclosure.

As shown in FIG. 1, FIG. 2 and FIG. 4, a true-seeing infrared industrial endoscope is provided. The true-seeing infrared industrial endoscope includes an external shell protective unit. The external shell protective unit includes a housing and an electrical appliance component box 2 connected to a rear end of the housing. A cavity of the housing is provided with a dual capturing-imaging unit including a capturing-imaging subunit I and a capturing-imaging subunit II. The capturing-imaging subunit I includes a light splitter I 13 disposed at a central portion of the cavity of the housing, an image capturing lens I 14 disposed at a front portion of the cavity of the housing and connected to a front end of the light splitter I 13 via an image guide fiber, an infrared imaging tube I 12 disposed at a rear portion of the cavity of the housing and communicating with a light outlet I 34 at a rear end of the light splitter I 13, and a visible light imaging tube I 11 disposed at the rear portion of the cavity of the housing and connected to a light outlet II 37 at the rear end of the light splitter I 13. The capturing-imaging subunit II includes a light splitter II 17 disposed at the central portion of the cavity of the housing, an image capturing lens II 18 disposed at the front portion of the cavity of the housing and connected to the front end of the light splitter II 17 via the image guide fiber, an infrared imaging tube II 16 disposed at the rear portion of the cavity of the housing and communicating with the light outlet I 34 at a rear end of the light splitter II 17, and a visible light imaging tube II 15 disposed at the rear portion of the cavity of the housing and connected to the light outlet II 37 on the rear end of the light splitter II 17.

The electrical appliance component box 2 is provided with a communication module 8 and a power supply 1 that is electrically connected to the dual capturing-imaging unit and the communication module 8. The communication module 8 is communicated with the dual capturing-imaging unit and is connected to an upper computer via a communication bus 9. The power supply 1 is electrically connected to the dual capturing-imaging unit via a power bus.

Figure 3:
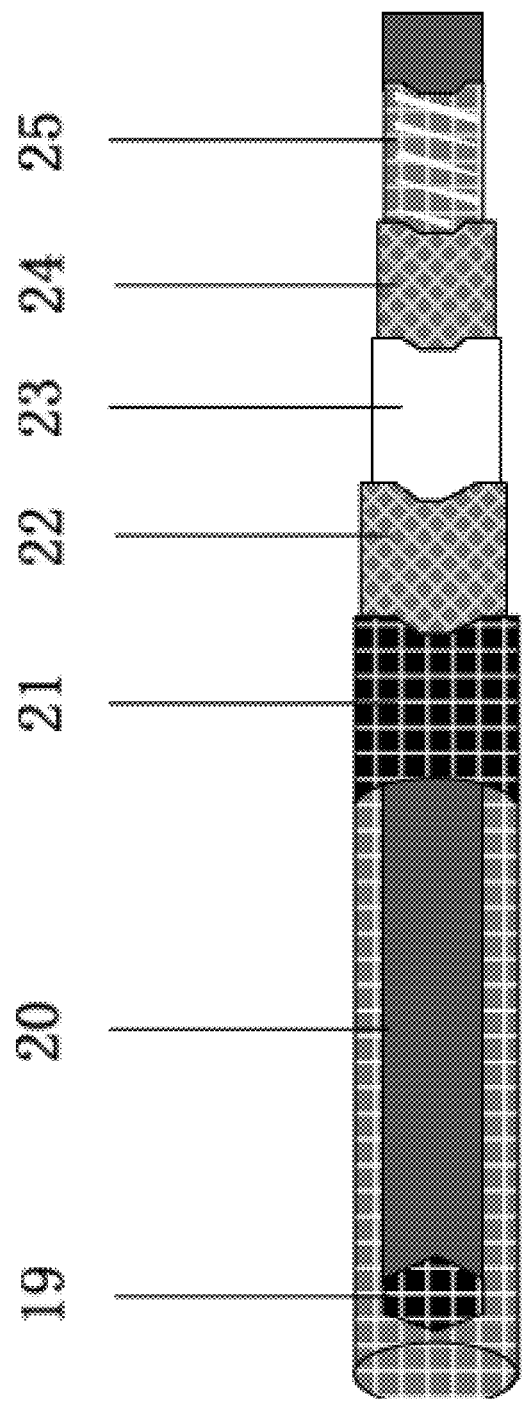
FIG. 3 is a structural schematic diagram of an infrared imaging tube according to an embodiment of the disclosure.

As shown in FIG. 2, FIG. 3 and FIG. 4, each of two infrared imaging tubes (i.e., the infrared imaging tube I 12 and the infrared imaging tube II 16) includes elongated chalcogenide glass 20 and an infrared imaging chip 19. A front end of the chalcogenide glass 20 is connected to the light outlet I 34 of the light splitter (i.e., the light splitter I 13 and the light splitter II 17), and a rear end of the chalcogenide glass 20 is communicatively connected to the infrared imaging chip 19. An axially external surface of the chalcogenide glass 20 is covered with an internal protective layer I 25 in which the infrared imaging chip 19 is embedded. An axial external surface of the internal protective layer I 25 is sequentially covered with an internal protective skin I 24, a protective tube I 23, an external protective skin I 22 and an external protective layer I 21. The chalcogenide glass 20 is a transmission channel for infrared light and is used for transmitting the infrared light from the light splitters (i.e., the light splitter I 13 and the light splitter II 17) to the infrared imaging chip 19.

Figure 5:
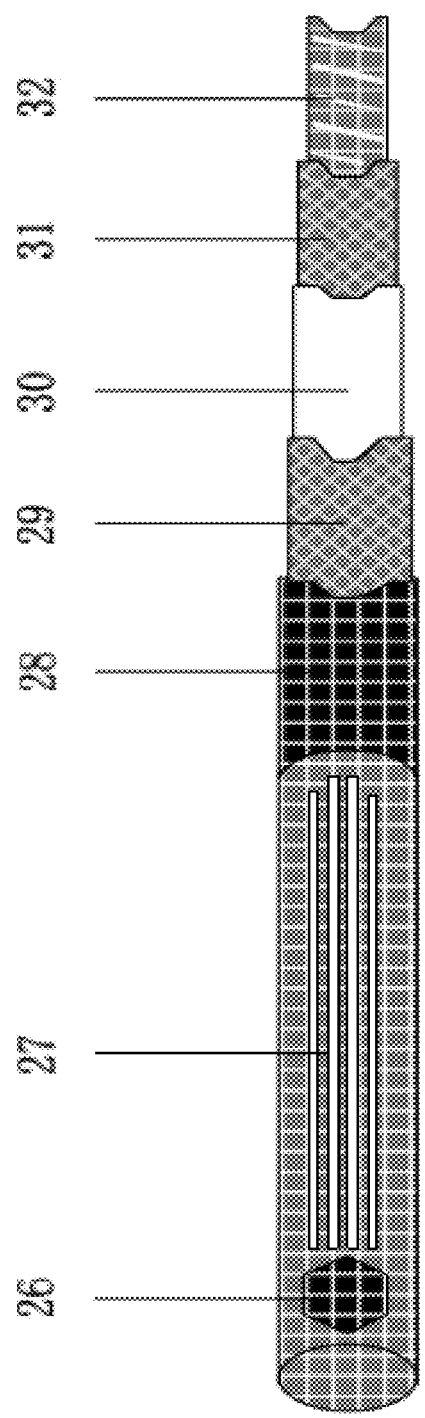
FIG. 5 is a structural schematic diagram of a visible light imaging tube according to an embodiment of the disclosure.
Figure 6:
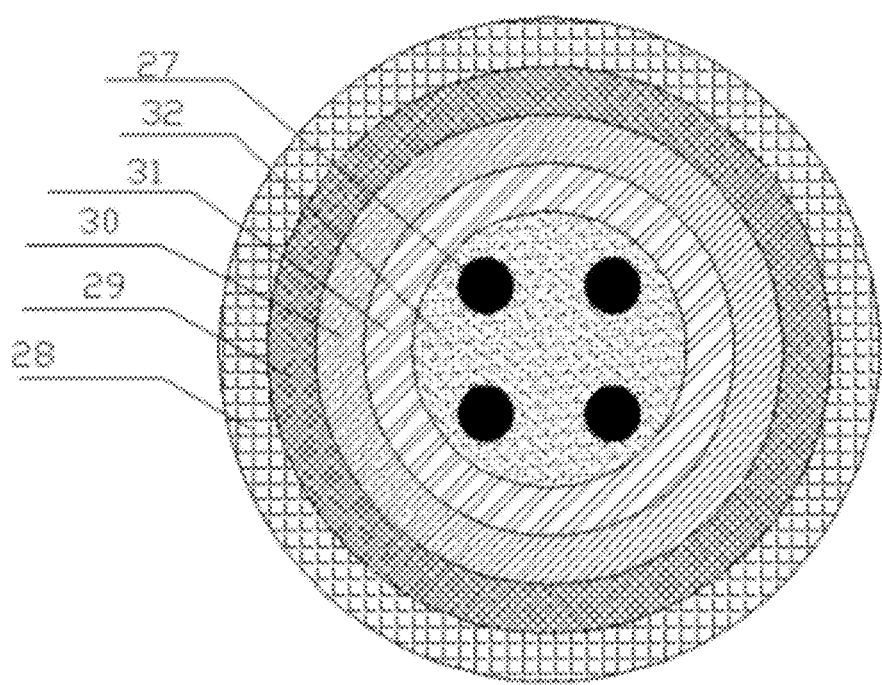
FIG. 6 is an enlarged diagram of a cross section of a visible light imaging tube according to an embodiment of the disclosure.

As shown in FIG. 2, FIG. 5 and FIG. 6, the visible light imaging tube (i.e., the visible light imaging tube I 11 or the visible light imaging tube II 15) includes an elongated image guide fiber 27 and a visible light imaging chip 26. A front end of the image guide fiber 27 is connected to the light outlet II 37 of the light splitter (that is, the light splitter I 13 or the light splitter II 17), and a rear end of the image guide fiber 27 is communicatively connected to the visible light imaging chip 26. An axial external surface of the image guide fiber 27 is covered with an internal protective layer II 32 in which the visible light imaging chip 26 is embedded. An axial external surface of the internal protective layer II 32 is sequentially covered with an internal protective skin II 31, a protective tube II 30, an external protective skin II 29 and an external protective layer II 2. The image guide fiber 27 is a transmission channel for visible light and is used for transmitting visible light rays from the light splitter (i.e., the light splitter I 13 or the light splitter II 17) to the visible light imaging chip 26.

Figure 7:
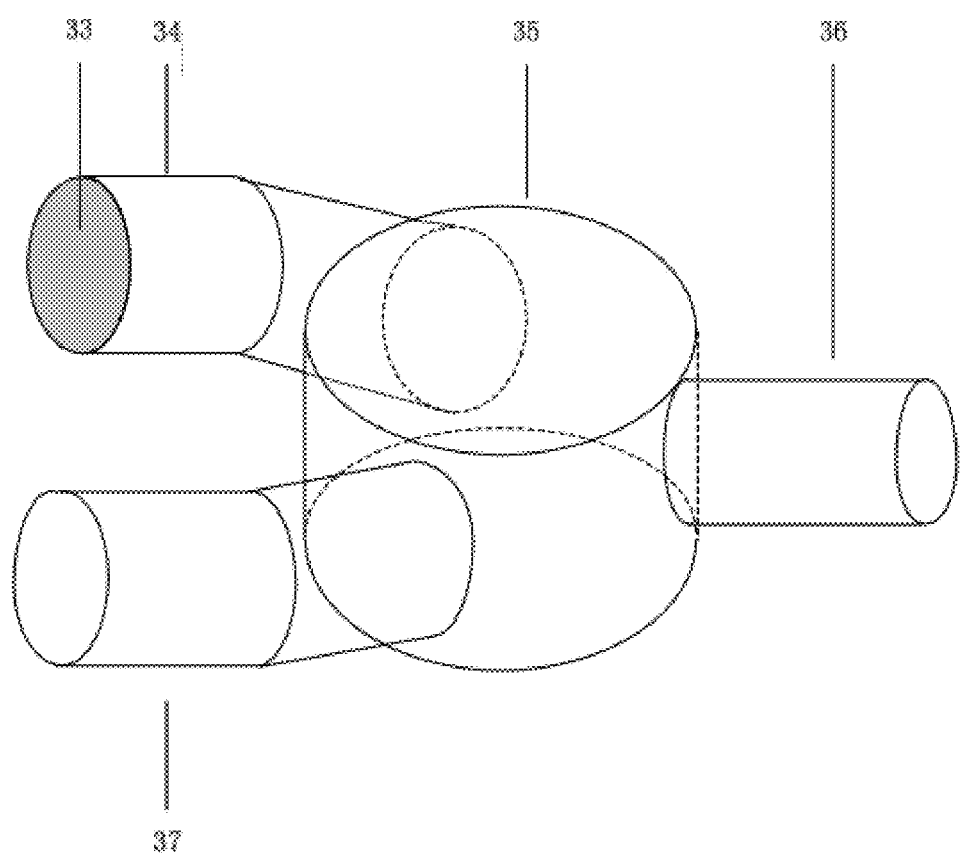
FIG. 7 is a structural schematic diagram of a light splitter according to an embodiment of the disclosure.

As shown in FIG. 2 and FIG. 7, each of two light splitters (i.e., the light splitter I 13 and the light splitter II 17) includes a light splitter body 35, a light inlet 36 communicating with a front end of the light splitter body 35, the light outlet II 37 connected to one side of a rear end of the light splitter body 35, and the light outlet I 34 connected to other side of the rear end of the light splitter body 35. An end face of the light outlet I 34 is further covered with a filter 33. The light inlet 36 is internally connected to the image capturing lens via the image guide fiber, the light outlet II 37 is connected to the visible light imaging tube I 11 and the visible light imaging tube II 15 via the image guide fiber, and the light outlet I 34 is connected to the infrared imaging tube I 12 and the infrared imaging tube II 16 via the chalcogenide glass.

As shown in FIG. 1, the housing consists of an external protective shell 6 and an internal protective shell 7. The cavity between the external protective shell 6 and the internal protective shell 7 forms a water-cooling circulation channel. A lower end portion of the external protective shell 6 is provided with a water inlet 10 communicating with the water-cooling circulation channel, and an upper end portion of the external protective shell 6 is provided with a water outlet 4 communicating with the water-cooling circulation channel. The water inlet 10, the water-cooling circulation channel, and the water outlet 4 are communicated in sequence and form a water wall cooling system. The upper end portion of the external protective shell 6 is further provided with an air inlet 5. Each of the two image capturing lenses (the image capturing lens I 14 and the image capturing lens II 18) is of a horn shape and is arranged with a horn mouth facing towards the front end of the cavity of the housing. The air inlet 5, the cavity of the housing, the cavity of the image capturing lens and the horn mouth of the image capturing lens are communicated in sequence and form an air-cooling system.

According to the true-seeing infrared industrial endoscope provided by this embodiment, light is captured or obtained by the image capturing lens I 14 and an image capturing lens II 18, and then are spited by the light splitter I 13 and a light splitter II 17 into two light paths. For one light path, only infrared light is transmitted after filtering by the light filter 33, enters the infrared imaging tube I 12 and the infrared imaging tube II 16, and is transmitted to the infrared imaging chip 19 via the infrared imaging tube I and the infrared imaging tube II and generates infrared digital images. For the other light path, light enters the visible light imaging tube I 11 and the visible light imaging tube II 15, then is transmitted to the visible light imaging chip 26 via the visible light imaging tube I 11 and the visible light imaging tube II 15, and is converted into visible light digital images. The infrared digital images and the visible light digital images are imaged via a communication module outside of the furnace. Therefore, the true-seeing infrared industrial endoscope provided by this embodiment not only can overcome the harsh environment of the high temperature, high pressure, high dust and lightness in the furnace and obtain clear images of the interior of the industrial furnace, but also obtains temperature information of the interior of the industrial furnace, so as to obtain and utilize the depth-of-field information for three-dimensional reconstruction, achieving an online monitoring function.

Figure 8:
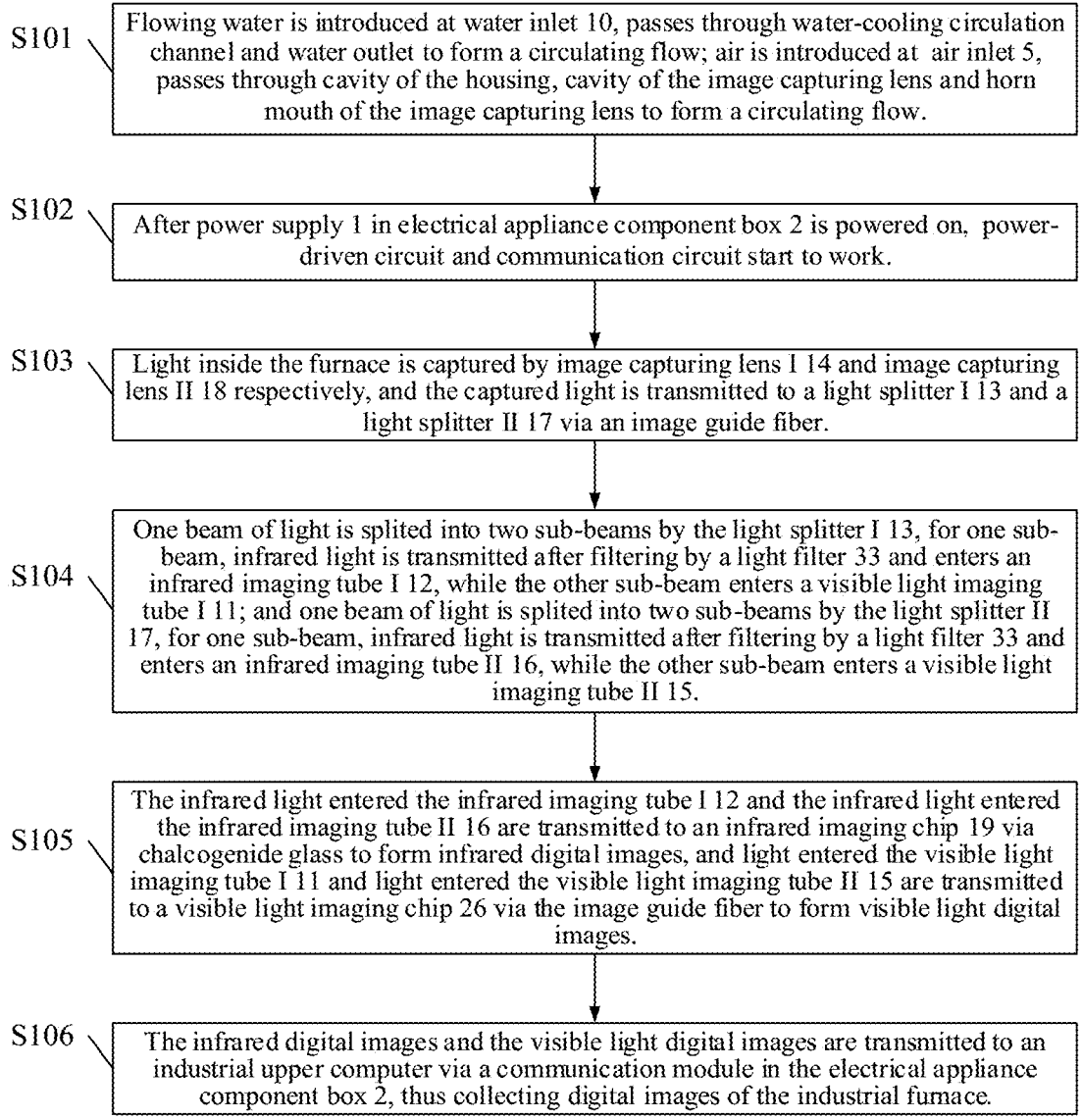
FIG. 8 is a flowchart of an image capturing method by using a true-seeing infrared industrial endoscope according to an embodiment of the disclosure.

As shown in FIG. 8, the disclosure further provides an image capturing method by using a true-seeing infrared industrial endoscope. The method includes the following steps.

At S101, flowing water is introduced at a water inlet 10, passes through a water-cooling circulation channel and a water outlet to form a circulating flow. Air introduced at an air inlet 5, and passes through a cavity of a housing, a cavity of an image capturing lens and a horn mouth of the image capturing lens to form a circulating flow. By introducing the water and the gas at the water inlet 10 and the air inlet 5 and forming the circulating flows, it is guaranteed that the whole device can work normally under the high-temperature environment of an industrial smelting furnace.

At S102, after a power supply 1 in an electrical appliance component box 2 is powered on, a power-driven circuit and a communication circuit start to work.

At S103, light inside the furnace is captured by an image capturing lens I 14 and an image capturing lens II 18 respectively, and the captured light is transmitted to a light splitter I 13 and a light splitter II 17 via an image guide fiber respectively.

At S104, one beam of light is splitted into two sub-beams by the light splitter I 13, for one sub-beam, infrared light is transmitted after filtering by a light filter 33 and enters an infrared imaging tube I 12, while the other sub-beam enters a visible light imaging tube I 11; and one beam of light is splitted into two sub-beams by the light splitter II 17, for one sub-beam, infrared light is transmitted after filtering by a light filter 33 and enters an infrared imaging tube II 16, while the other sub-beam enters a visible light imaging tube II 15.

At S105, the infrared light entered the infrared imaging tube I 12 and the infrared light entered the infrared imaging tube II 16 are transmitted to an infrared imaging chip 19 via chalcogenide glass to form infrared digital images, and the visible light entered the visible light imaging tube I 11 and the visible light entered the visible light imaging tube II 15 are transmitted to a visible light imaging chip 26 via the image guide fiber to form visible light digital images, thus achieving a function of collecting digital images and temperature information to the industrial furnace.

At S106, the infrared digital images and the visible light digital images are transmitted to an industrial upper computer via a communication module in the electrical appliance component box 2, and three-dimensional reconstruction is carried out by using depth-of-field information via the upper computer, so as to achieve an online monitoring function.

Regarding the image capturing method by using the true-seeing infrared industrial endoscope provided by this embodiment, it is guaranteed that the true-seeing infrared industrial endoscope can work normally under the high-temperature environment of the furnace through air-cooling and water wall cooling of the cooling system. In addition, in the case of light in the furnace, visible light digital images and infrared digital images can be formed simultaneously through the visible light imaging tube I 11 and the infrared imaging tube I 12 via the image capturing lens I 14 in the furnace, as well as can be formed simultaneously through the infrared imaging tube II 16 and the visible light imaging tube II 15 via the image capturing lens II 18; in the case of almost no light in the furnace, images can be formed independently through the infrared imaging tube I 12 and the infrared imaging tube II 16, and the obtained digital images are transmitted to the subsequent element at the rear end of the endoscope through an infrared imaging chip 19 and a visible light imaging chip 26, and then imaged via a communication module such as a communication module 8 and the like outside of the furnace and transmitted to an industrial upper computer, thus completing a whole working process. Therefore, the image capturing method by using the true-seeing infrared industrial endoscope provided by this embodiment can design a corresponding protective measure for the special environment of the industrial furnace, and can be used in the industrial furnace with the harsh internal environment. Furthermore, the endoscope has good water cooling effect, good heat dissipation effect, and greatly prolonged service life. Meanwhile, the disclosure achieves an online monitoring function of three-dimensional reconstruction by obtaining and utilizing depth-of-field information.

The image capturing method by using the true-seeing infrared industrial endoscope provided by this embodiment and the true-seeing infrared industrial endoscope are originated from a same technical concept, and have corresponding beneficial effects, which will not be repeated herein.

The invention claimed is:

1. A true-seeing infrared industrial endoscope, comprising an external shell protective unit, wherein the external shell protective unit comprises a housing and an electrical appliance component box connected to a rear end of the housing;
    wherein a cavity of the housing is provided with a dual capturing-imaging unit comprising at least two capturing-imaging subunits, and each of the capturing-imaging subunits comprises a light splitter disposed at a central portion of the cavity of the housing, an image capturing lens disposed at a front portion of the cavity of the housing and connected to a front end of the light splitter via an image guide fiber, an infrared imaging tube disposed at a rear portion of the cavity of the housing and communicating with a light outlet I at a rear end of the light splitter, and a visible light imaging tube disposed at the rear portion of the cavity of the housing and communicating with a light outlet II at the rear end of the light splitter;
    the electrical appliance component box is provided with a communication module and a power supply electrically connected to the dual capturing-imaging unit and the communication module; and wherein the communication module is communicatively connected to the dual capturing-imaging unit and an upper computer via a communication bus, and the power supply is electrically connected to the dual capturing-imaging unit via a power bus,
    the housing consists of an external protective shell and an internal protective shell; the cavity between the external protective shell and the internal protective shell forms a water-cooling circulation channel; a lower end of the external protective shell is provided with a water inlet communicating with the water-cooling circulation channel, and an upper end of the external protective shell is provided with a water outlet communicating with the water-cooling circulation channel, so that the water inlet, the water-cooling circulation channel and the water outlet are communicated in sequence and form a water wall cooling system; and the upper end of the external protective shell is further provided with an air inlet, and the image capturing lens is of a horn shape and is arranged as a horn mouth facing towards the front end of the cavity of the housing and communicating with an external environment, so that the air inlet, the cavity of the housing, a cavity of the image capturing lens and the horn mouth of the image capturing lens are communicated in sequence and form an air-cooling system;

wherein the true-seeing infrared industrial endoscope is suitable for an environment inside an industrial furnace, and is capable of obtaining clear images of the interior of the industrial furnace, and temperature information of the interior of the industrial furnace, so as to obtain and utilize depth-of-field information for three-dimensional reconstruction, achieving an online monitoring function.

2. The true-seeing infrared industrial endoscope of claim 1, wherein the infrared imaging tube is of an elongated shape, and comprises elongated chalcogenide glass and an infrared imaging chip; wherein a front end of the chalcogenide glass is connected to the light outlet I of the light splitter, a rear end of the chalcogenide glass is communicatively connected to the infrared imaging chip, and an axial external surface of the chalcogenide glass is covered with an internal protective layer I into which the infrared imaging chip is embedded; wherein an axial external surface of the internal protective layer I is sequentially covered with an internal protective film I, a protective tube I, an external protective film I and an external protective layer I;

the visible light imaging tube is of an elongated shape, and comprises an elongated image guide fiber and a visible light imaging chip; wherein a front end of the image guide fiber is connected to the light outlet II of the light splitter, a rear end of the image guide fiber is connected to the visible light imaging chip, and an axial external surface of the image guide fiber is covered with an internal protective layer II into which the visible light imaging chip is embedded; an axial external surface of the internal protective layer II is sequentially covered with an internal protective film II, a protective tube II, an external protective film II and an external protective layer II.

3. The true-seeing infrared industrial endoscope of claim 1, wherein the light splitter comprises a light splitter body, a light inlet communicating with a front end of the light splitter body, the light outlet II connected to one side of a rear end of the light splitter body, and the light outlet I connected to other side of the rear end of the light splitter body; an end face of the light outlet I is further covered with a light filter; the light inlet is internally connected to the image capturing lens via the image guide fiber, the light outlet II is connected to the visible light imaging tube via the image guide fiber, and the light outlet I is connected to the infrared imaging tube via the chalcogenide glass.

4. An image capturing method by using the true-seeing infrared industrial endoscope of claim 1, comprising:

after powering on the power supply in the electrical appliance component box, starting a power-driven circuit and a communication circuit to work;

capturing light inside a furnace by the image capturing lens, and transmitting the captured light to the light splitter via the image guide fiber;

splitting one beam of light into two sub-beams by the light splitter, wherein for one sub-beam, infrared rays is transmitted after filtering by the light filter and enters the infrared imaging tube, while other sub-beam enters the visible light imaging tube;

transmitting the infrared light entered the infrared imaging tube to the infrared imaging chip via the chalcogenide glass to form infrared digital images, and transmitting the visible light entered the visible light imaging tube to the visible light imaging chip via the image guide fiber to form visible light digital images, thus collecting digital images and temperature information of an industrial furnace; and transmitting the infrared digital images and the visible light digital images to an industrial upper computer via the communication module in the electrical appliance component box, and carrying out three-dimensional reconstruction by using depth-of-field information via the upper computer, so as to achieve an online monitoring function.

5. The image capturing method by using the true-seeing infrared industrial endoscope of claim 4, further comprising the following steps before powering on the power supply in the electrical appliance component box:

introducing flowing water at a water inlet, and enabling the flowing water to pass through a water-cooling circulation channel and a water outlet, so as to form a circulating flow; and introducing air at an air inlet, and enabling the air to pass through a cavity of a housing, a cavity of the image capturing lens and a horn mouth of the image capturing lens, so as to form a circulating flow.

6. The true-seeing infrared industrial endoscope of claim 2, wherein the light splitter comprises a light splitter body, a light inlet communicating with a front end of the light splitter body, the light outlet II connected to one side of a rear end of the light splitter body, and the light outlet I connected to other side of the rear end of the light splitter body; an end face of the light outlet I is further covered with a light filter; the light inlet is internally connected to the image capturing lens via the image guide fiber, the light outlet II is connected to the visible light imaging tube via the image guide fiber, and the light outlet I is connected to the infrared imaging tube via the chalcogenide glass.

* * * * *